(No Model.)

C. O. WILDER.
INDICATOR ATTACHMENT FOR CHUCKS.

No. 369,489. Patented Sept. 6, 1887.

Witnesses
A. M. Hood.
C. M. Hood.

Inventor
Charles O. Wilder
By his Attorney
H. P. Hood

UNITED STATES PATENT OFFICE.

CHARLES O. WILDER, OF INDIANAPOLIS, INDIANA.

INDICATOR ATTACHMENT FOR CHUCKS.

SPECIFICATION forming part of Letters Patent No. 369,489, dated September 6, 1887.

Application filed April 27, 1887. Serial No. 236,280. (No model.)

*To all whom it may concern:*

Be it known that I, CHARLES O. WILDER, a citizen of the United States, residing at Indianapolis, in the county of Marion and State of Indiana, have invented a new and useful Indicator Attachment for Chucks, of which the following is a specification.

My invention relates to an improved device designed to be attached to chucks for holding work in the lathe or boring-mill, whereby the relative sizes of different pieces of work secured in the chuck may be readily indicated.

My device is more particularly intended for use in connection with the process of boring the hubs of car-wheels to receive the axles.

A series of car-wheels cast from the same pattern will vary slightly in diameter, and it is desirable that there should be some inexpensive means for indicating those wheels which are of the same diameter.

The object of my improvement is to provide a device which may readily be secured to an ordinary chuck, whereby the slight movement of one of the jaws of the chuck may cause an index-hand to move over a relatively wide space on a graduated arc arranged near the periphery of the chuck in such a position that the arc is not covered by the wheel or other work secured in the chuck, and having its graduations so widely separated and plainly marked as to be easily seen and readily read.

The accompanying drawings illustrate my invention.

Figure 1:
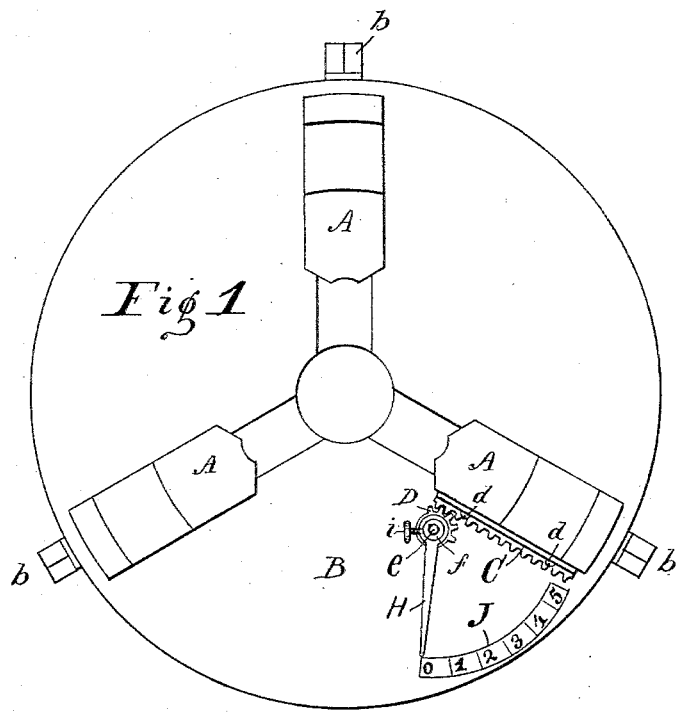
Figure 2:
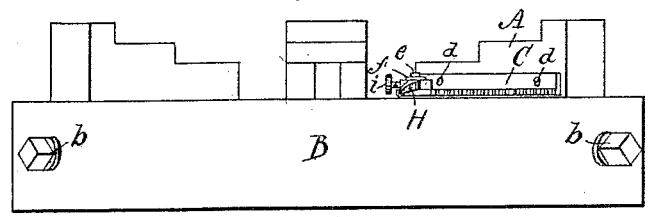
Figure 3:
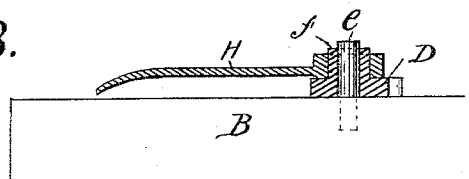

Figure 1 is a plan of an ordinary chuck with my attachment. Fig. 2 is an elevation of the same. Fig. 3 is a longitudinal section on an enlarged scale of the index-hand and the pinion on which it is mounted.

The chuck is of the common well-known form, having jaws A A A, sliding in radial grooves in the body of the chuck B, and operated by screws $b\ b\ b$, which may be geared together, so as to operate simultaneously, or may be operated independently.

C is a rack-bar, which is secured by screws $d\ d$ or other suitable means to one of the jaws A, so as to move therewith.

D is a toothed pinion arranged to revolve on a stud, $e$, projecting from the face of the chuck-body B and to engage the rack-bar C. The pinion D is provided with a hub, $f$, to which the index-hand H is adjustably secured, so as to move with the pinion by means of a set-screw, $i$.

J is a graduated arc over which the point of the index-hand moves. It will be observed that this arc, which may be a separate plate secured to the face of the chuck, or may be marked on the chuck itself, is arranged near the periphery of the chuck at a point not covered by the largest piece of work which the chuck may hold, and that the relation of the index-hand to the rack and pinion is such that a slight movement of the jaw will cause the point of the hand to pass over a comparatively wide space, thus enabling the operator to easily note slight differences in the diameters of wheels held between the jaws.

In operation a wheel of standard size, and known as "No. 1," having been placed in the chuck and tightly secured by screwing the jaws in against its periphery, the index-hand, turning loosely on the hub $f$ of pinion D, is placed opposite the graduation 1 on the arc, and is then secured in position by means of the set-screw $i$. The standard wheel being now released and another wheel placed in the chuck, if when it is secured the index-hand stands at 1, the wheel is of the same diameter as the other and is marked 1; if at 2, the wheel is marked 2, and so on for the different sizes.

I claim as my invention—

1. The combination, with a chuck having jaws adapted to grasp and hold cylindrical objects, as a car-wheel, one or more of which jaws are arranged to slide radially, of a rack-bar secured to the sliding jaw, a pinion mounted on the face of the chuck and arranged to engage the rack-bar, an index-hand secured to the pinion, and a graduated arc on the chuck, all arranged to co-operate substantially as and for the purpose specified.

2. In an indicating attachment for chucks, the combination, with one of the sliding jaws of the chuck, of an index-hand mounted on the body of the chuck and arranged to engage the sliding jaw, so as to be actuated by the movement thereof, and a graduated arc arranged in the path of said index-hand.

3. The combination, with the chuck having jaws adapted to grasp and hold cylindrical objects, as a car-wheel, one or more of which jaws are arranged to slide radially, a rack-bar secured to the sliding jaw, the pinion mounted on the face of the chuck and arranged to engage the rack-bar, and the graduated arc on the chuck, of the index-hand adjustably secured to the pinion, substantially as and for the purpose specified.

CHAS. O. WILDER.

Witnesses:
 H. P. HOOD,
 A. M. HOOD.